United States Patent
Kubat et al.

(10) Patent No.: US 7,710,878 B1
(45) Date of Patent: May 4, 2010

(54) METHOD AND SYSTEM FOR ALLOCATING TRAFFIC DEMANDS IN A RING NETWORK

(75) Inventors: Peter Kubat, Sudbury, MA (US); James MacGregor Smith, Amherst, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1294 days.

(21) Appl. No.: 10/339,887

(22) Filed: Jan. 10, 2003

(51) Int. Cl.
   *G08C 15/00* (2006.01)
(52) U.S. Cl. .................. 370/237; 370/424; 370/452
(58) Field of Classification Search .......... 370/229, 370/230, 230.1, 231, 232, 233, 234, 235, 370/237, 424, 452
   See application file for complete search history.

(56) References Cited

U.S. PATENT DOCUMENTS

| | | | |
|---|---|---|---|
| 5,546,542 A * | 8/1996 | Cosares et al. ............. | 709/241 |
| 6,222,848 B1 | 4/2001 | Hayward et al. ............ | 370/412 |
| 6,377,548 B1 * | 4/2002 | Chuah ....................... | 370/233 |
| 6,643,464 B1 * | 11/2003 | Roorda et al. ................ | 398/59 |
| 6,917,586 B1 * | 7/2005 | Mauger et al. ............. | 370/230 |
| 7,054,951 B1 * | 5/2006 | Kao et al. ................... | 709/242 |
| 7,110,355 B1 * | 9/2006 | Oz et al. ..................... | 370/222 |
| 7,126,910 B1 * | 10/2006 | Sridhar ....................... | 370/229 |
| 7,283,740 B2 * | 10/2007 | Kinoshita et al. ............. | 398/5 |
| 2002/0018481 A1 * | 2/2002 | Mor et al. ................... | 370/403 |
| 2003/0067871 A1 * | 4/2003 | Busi et al. ................... | 370/222 |
| 2003/0103449 A1 * | 6/2003 | Barsheshet et al. ......... | 370/222 |
| 2004/0162718 A1 * | 8/2004 | Watkins et al. ............... | 703/21 |

OTHER PUBLICATIONS

Gunes Aybay, Mannix O'Connor, Kanaiya Vasani and Tim Wu, An Introduction to Resilient Packet Ring Technology, http://www.rpralliance.com/articles/ACF16, a White Paper by the Resilient Packet Ring Alliance, Oct. 2001, 16 pages.

Resilient Packet Ring Fairness Protocol, An Overview by the Resilient Packet Ring Alliance, http://www.rpralliance.com/articles/ACF1A, Jun. 2002, 4 pages.

* cited by examiner

Primary Examiner—Jason E Mattis (57) ABSTRACT

A method of allocating a plurality of traffic demands on a network having a plurality of stations connected by a bi-directional ring is disclosed. The method comprises selecting a first traffic demand from the plurality of traffic demands. The method then acquires a first existing traffic volume for a first direction of the bi-directional ring and a second existing traffic volume for a second direction of the bi-directional ring. Either the first or second direction is selected for transmitting the first traffic demand based on the smallest incremental increase in the load of the bi-directional ring.

19 Claims, 4 Drawing Sheets

| Traffic Demand | Demand Volume | Originating Station | Destination Station | Selected Ring |
|---|---|---|---|---|
| $D_0$ | 100 Mbps | 250c | 250d | Clockwise (212) |
| $D_1$ | 70 Mbps | 250a | 250d | Counter-clockwise (214) |
| $D_2$ | 60 Mbps | 250d | 250b | Clockwise (212) |
| $D_3$ | 30 Mbps | 250d | 250a | Counter-clockwise (214) |
| $D_4$ | 20 Mbps | 250a | 250b | Clockwise (212) |
| $D_5$ | 10 Mbps | 250b | 250c | Clockwise (212) |
| ⋮ | ⋮ | ⋮ | ⋮ | ⋮ |
| $D_Q$ | ⋮ | ⋮ | ⋮ | ⋮ |

METHOD AND SYSTEM FOR ALLOCATING TRAFFIC DEMANDS IN A RING NETWORK

BACKGROUND OF THE INVENTION

1. Field of the Invention

The present invention relates generally to communication network management, and more particularly to a method and system for allocating traffic demands in full duplex, ring topology networks.

2. Description of the Prior Art

Traditional metropolitan networks have been designed for voice rather than data services using circuit-oriented technologies such as Synchronous Optical Networks (SONETs). Because SONET-based time-division multiplex (TDM) networks are typically deployed over fiber rings, much of the existing fiber plant in metropolitan areas is in ring form. Ring topologies enable SONET to implement a fast (e.g., sub 50 ms) protection mechanism that can restore connectivity using an alternate path around the ring in case of fiber cuts or equipment failure. The rapidly increasing demand for data traffic, however, is challenging the capacity limits of these existing transport infrastructures. This is compounded by the fact that SONET-based networks generally utilize available bandwidth inefficiently. Specifically, SONET was designed for point-to-point, circuit-switched applications, where each circuit is allocated a fixed amount of bandwidth that is wasted when not in use. Such fixed allocation puts a limit on the maximum burst data-transfer rate between endpoints, which is a disadvantage for data traffic because data traffic is inherently bursty. In other words, traffic may flow intensely between two devices and then stop abruptly.

With advances in packet-oriented technologies such as Optical Gigabit Ethernet technology, which is capable of supporting fiber spans of large distances, Ethernet technologies have emerged as a viable alternative for data transport in public networks. As nearly all data packets begin and end their trip across the Internet as Ethernet frames, carrying data in a consistent packet format from start to finish throughout the entire transport path eliminates the need for additional layers of protocol and synchronization that result in extra costs and complexity. In addition to efficient handling of IP packets, Ethernet has the advantages of familiarity, simplicity, and low cost. Despite these benefits, Ethernet switches rely on Ethernet bridging or IP routing for bandwidth management. Thus, while Ethernet switches can provide link-level fairness, this does not necessarily or easily translate into global fairness.

Consequently, neither SONET nor Ethernet effectively manages a shared resource such as a fiber ring shared across thousands of potential subscribers. More particularly, the network is underutilized in the case of SONET and non-deterministic in the case of Ethernet.

One emerging solution for data transport applications is Resilient Packet Ring (RPR) technology, a network architecture and technology designed to meet the requirements of a packet-based data traffic. It provides features typically associated with SONET—efficient support for ring topology and fast recovery from fiber cuts and link failures—while at the same time, providing data efficiency, simplicity, and cost advantages that are typical to Ethernet.

Figure 1:
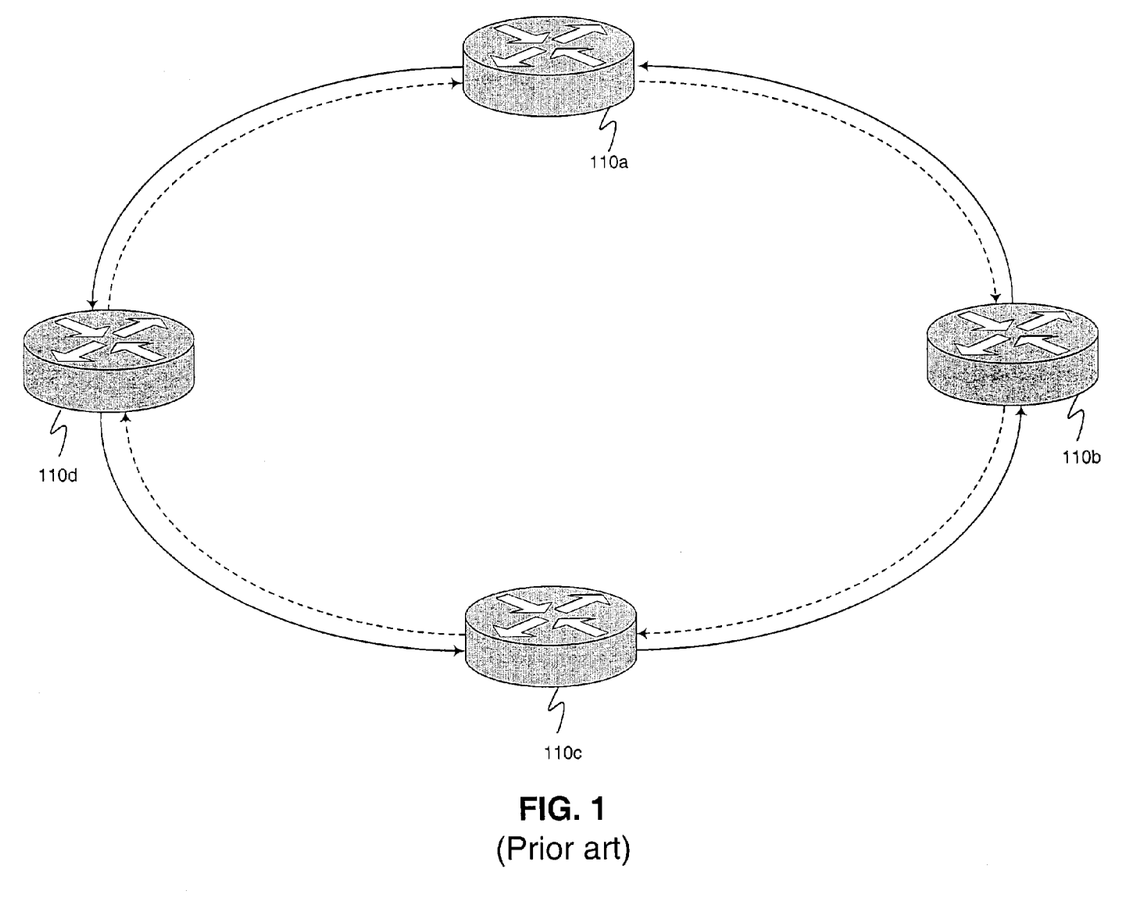
FIG. 1 illustrates an exemplary ring consistent with conventional RPR topology having four nodes.

Generally described, RPR is typically implemented on two cross directional loops (or one bi-directional ring) connecting each RPR device, or node. At each node, traffic that is not destined for the node simply passes through and does not get queued and scheduled. FIG. 1 illustrates an exemplary ring consistent with conventional RPR topology having four nodes: 110a, 110b, 110c and 110d. Each of these nodes may be aware of the location of each other node via a topology discovery protocol. For example, node 110a may be aware that node 110b is one segment clockwise and three segments counterclockwise from node 110a. The traffic demands on the ring are allowed to be routed on either side of the ring, and capacity for all spans of the ring may be required to be equal. Conventionally, when a traffic demand is to be originated from a particular node, the node selects the direction that requires the shortest transit path to the destination (i.e., the smallest number of links) and then inserts the traffic in that direction. Bandwidth is only consumed on the traversed segments.

However, RPR rings are still subject to becoming poorly routed. As traffic demands are provisioned and de-provisioned, certain spans of the ring may become congested while other spans become under utilized. By actively managing the traffic demands within a network, overall utilization may be increased and the need for adding new capacities to the network may be decreased. Therefore there is a need for a method and system of optimizing the routing of traffic demands for efficient utilization of network capacities.

SUMMARY OF THE INVENTION

In accordance with an aspect of the present invention, a method of allocating a plurality of traffic demands on a network having a plurality of stations connected by a bi-directional ring is disclosed. The method comprises selecting a first traffic demand from the plurality of traffic demands. The method then acquires a first existing traffic volume for a first direction of the bi-directional ring and a second existing traffic volume for a second direction of the bi-directional ring. Either the first or second direction is selected for transmitting the first traffic demand based on the smallest incremental increase in the load of the bi-directional ring.

In another aspect of the present invention, a method of allocating a plurality of traffic demands on a network having a first station and a second station connected by a first ring for transmitting traffic in a first direction and a second ring for transmitting traffic in a second direction is disclosed. The method comprises the step of receiving a first traffic demand at the first station destined for the second station, wherein the first traffic demand may be routed between the first and second stations on the first or second ring and the first and second stations are connected by a first and second segment to form the first ring and a third and fourth segment to form the second ring. The method then determines a first, a second, a third, and a fourth existing load on the first, second, third, and fourth segments, respectively, and selects between the first and second rings to transmit the first traffic demand based on which ring will provide the smallest increase in the first, second, third, and fourth existing loads. The method subsequently routes the first traffic demand on the selected ring.

In accordance with an additional aspect of the present invention, a Resilient Packet Ring system is disclosed. The system comprises a plurality of stations interconnected by segments in a ring topology, each of the stations capable of transmitting and receiving traffic demands in a first direction and a second direction. The system further comprises a first ring comprising a first set of segments for transmitting and receiving traffic demands in the first direction, and a second ring comprising a second set of segments for transmitting and receiving traffic demands in the second direction. The system also comprises a traffic management system for sequentially routing a plurality of traffic demands on the first and second rings to provide the smallest incremental increase in the maximum load of the first and second sets of segments.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing summary and the following detailed description are exemplary and explanatory and are intended to provide further explanation of the invention as claimed.

DETAILED DESCRIPTION OF THE INVENTION

Reference will now be made in detail to the present exemplary embodiments of the invention, examples of which are illustrated in the accompanying drawings. Wherever possible, the same reference numbers will be used throughout the drawings to refer to the same or like parts.

RPR or "Resilient Packet Ring" is a network architecture and technology for transmitting packet-based traffic. It provides features typically associated with SONET (efficient support for ring topology and fast recovery from fiber cuts and link failures) while at the same time, providing data efficiency, simplicity, and cost advantages that are typical to Ethernet. An example of an RPR network is described in the "IEEE 802.17 RPR Working Group Draft Standard v. 1.0," which is incorporated by reference.

Generally described, RPR comprises a Media Access Control (MAC) data link layer protocol optimized for transmission on resilient rings used in local area networks (LANs), wide area networks (WANs), and metropolitan area networks (MANs). As a layer 2 protocol, it should be appreciated that the RPR MAC is independent of the physical layer. Accordingly, RPR may be implemented on any physical layer, such as SONET or Ethernet.

RPR networks generally comprise transport stations that are typically connected in a ring topology, although alternate topologies may be used. For example, one bi-directional ring (i.e., two cross directional loops) may be used to connect each station. At each station, traffic that is not destined for the station simply passes through and does not get queued and scheduled. The RPR MAC entity at each station performs three functions: "add" for insertion of subscriber traffic from the station, "drop" or removal of traffic destined for a subscriber on the station, and "pass" or direct transfer of transit traffic from one network link to another. The transit path effectively becomes a part of the transmission medium and makes the RPR ring behave as one continuous medium shared by all the RPR stations.

Figure 2:
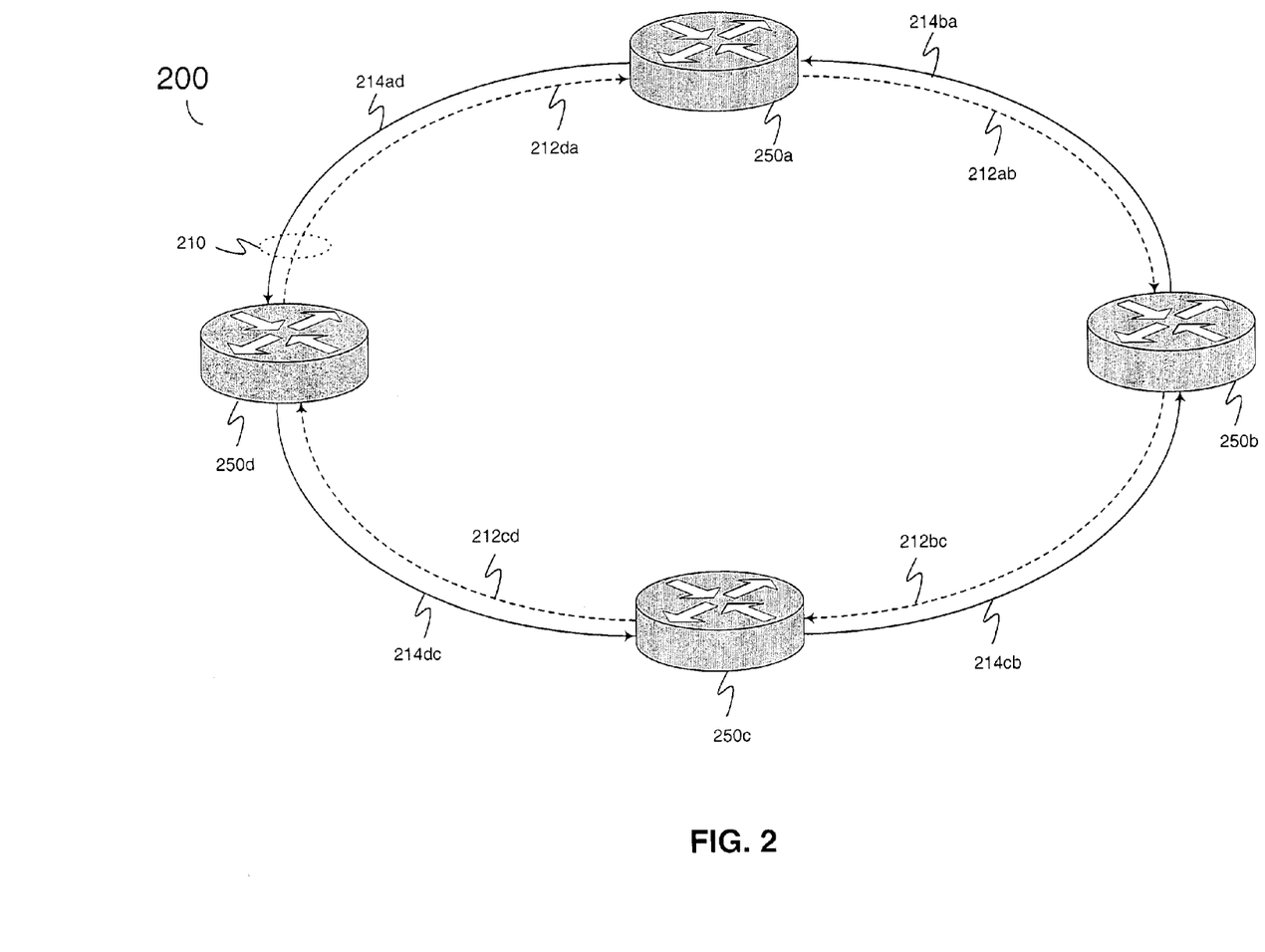
FIG. 2 illustrates a block diagram of an exemplary network, denoted as network 200, in accordance with methods and systems consistent with the present invention.

FIG. 2 illustrates a block diagram of an exemplary network environment 200 in accordance with one embodiment of the present invention. The elements illustrated in FIG. 2 may be implemented in a variety of hardware and software aspects, known to those skilled in the art. In addition, parts of the description will be presented in terms of operations performed by logical entities or computer systems under software control consistent with the manner commonly employed by those skilled in the art to convey the substance of their work to others skilled in the art. As known to those skilled in the art, these quantities take the form of electrical, magnetic, or optical signals capable of being stored, transferred, combined, and otherwise manipulated through mechanical and electrical components of a computer system; and the computer system includes general purpose as well as special purpose data processing machines, systems, and the like, that are standalone, adjunct, or embedded.

As shown in FIG. 2, network 200 includes four stations—250a, 250b, 250c, and 250d—connected by a duplex ring 210. Although only four stations are shown in FIG. 2, those skilled in the art will recognize that the embodiments of the present invention are not limited to that number and are shown only for simplicity. Duplex ring 210 is shown to comprise two transmission cable rings 212 and 214. In one embodiment, each transmission cable 212 and 214 may comprise an optical fiber, each fiber used for unidirectional transmission of optical signals from one station to an adjacent station in opposite directions. For example, FIG. 2 arbitrarily depicts ring 212 transmitting data in the clockwise direction (+) and ring 214 transmitting data in the counterclockwise direction (−). It should be appreciated that methods and systems consistent with the present invention are not limited to optical fiber rings. Moreover, the methods and systems of the present invention may be implemented using multi-ring topologies for additional bandwidth (e.g., multiple ring pairs or multiple aggregate cables).

In accordance with one embodiment of the present invention, bandwidth allocation in network 200 relies on the duplex ring nature of an RPR topology to efficiently handle multiple packets concurrently. Under normal operating conditions, the full duplex infrastructure allows concurrent transmission on rings 212 and 214. In other words, data may be concurrently transmitted and received in both the clockwise (+) and counterclockwise (−) directions. As further shown in FIG. 2, each unidirectional ring comprises multiple segments or links. For example, ring 212 is shown to comprise segments 212ab, 212bc, 212cd, and 212da; and ring 214 is shown to comprise segments 214ba, 214cb, 214dc, and 214ad. Traffic demands on ring 210 are allowed to be routed in either direction, and bandwidth is only consumed on the traversed segments. In other words, traffic can be sent between stations 250a and 250b on ring 212 without affecting the bandwidth available between stations 250b, 250c, and 250d. Based on the above-described infrastructure, traffic may be sent in either direction based on shortest distance, available bandwidth, and/or the like.

In accordance with methods and systems consistent with the present invention, traffic demands may comprise provisioned and unprovisioned transmissions of voice, video, data, and the like. As those skilled in the art should appreciate, a provisioned demand comprises a requested service that has been configured for transmission (e.g., creation of a subscriber record associated with the requested service). Traffic demands may also be categorized into two or more traffic classes. For example, a first class of traffic may include provisioned low-jitter traffic, such as interactive videoconferencing; a second class of traffic may include provisioned bounded-jitter traffic such as streaming video; and a third class of traffic may include unprovisioned traffic such as web surfing. For simplicity, the following exemplary embodiments will be described with reference to only provisioned traffic (e.g., the first and second classes). However, one skilled in the art should appreciate that the present invention may be practiced using all classes of traffic, both separately and in combination.

Figure 3:
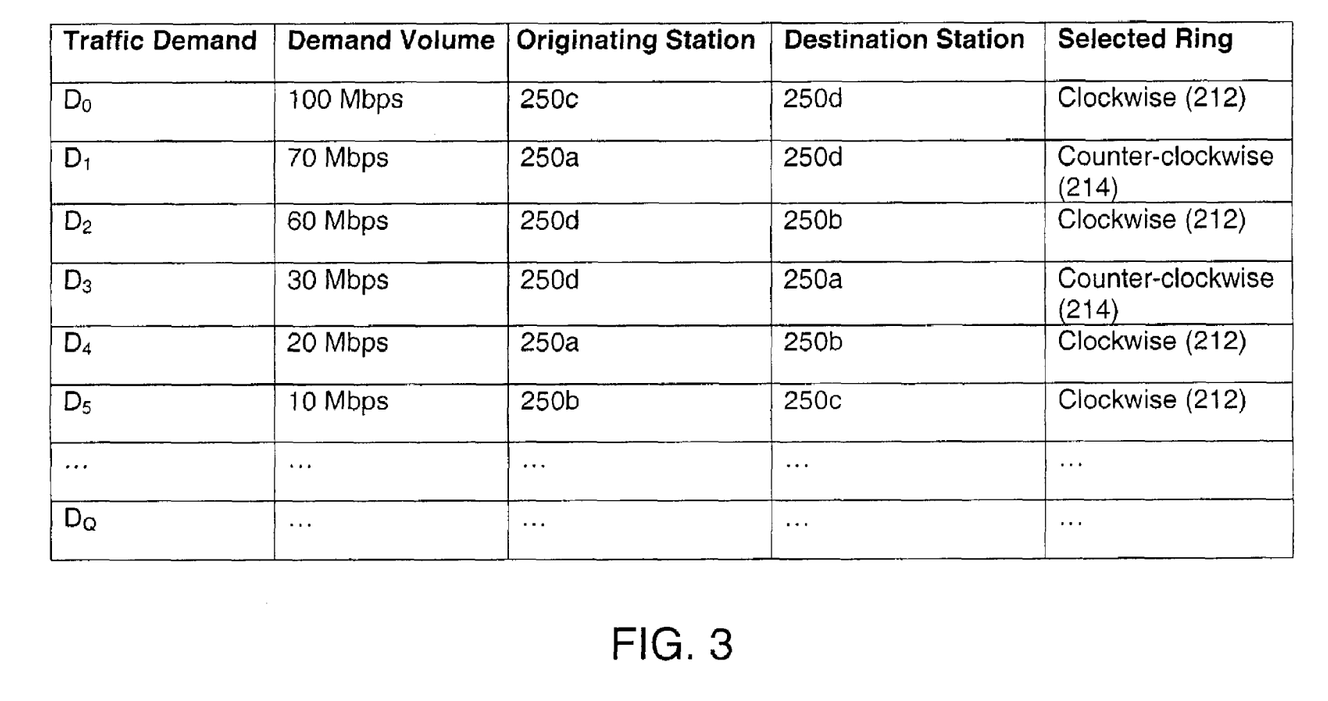
FIG. 3 illustrates a sequenced list of exemplary traffic demands $(D_1, D_2, \ldots, D_Q)$ that may be routed over exemplary network 200 in accordance with methods and systems consistent with the present invention.

Referring now to FIGS. 2 and 3, a load balancing method for allocating traffic demands on segments in accordance with one embodiment of the present invention will be described. FIG. 3 illustrates a list of exemplary traffic demands ($D_1$, $D_2$, ..., $D_M$) to be routed over network 200, where M represents the number of total traffic demands. In accordance with one embodiment of the present invention, each provisioned traffic demand ($D_1, D_2, ..., D_M$) is sorted according to size, for example, from largest to smallest. Then starting with the largest, each traffic demand is routed to either clockwise ring 212 or counterclockwise ring 214 according to the following algorithms.

For each $D_k$, k=1, 2, ..., Q, where $D_Q$ represents the smallest traffic demand, $T^+ < T^-$, then update $t_i^+ = t_{POTENTIALi}^+$; set $x_k = 1$ (route this demand on the clockwise ring 212);

$T^+ < T^-$, then update $t_i^- = t_{POTENTIALi}^-$; set $x_k = 0$ (route this demand on the counterclockwise ring 214);

$T^+ = T^-$ and $n^+ \leq n^-$, then update $t_i^+ = t_{POTENTIALi}^+$; set $x_k = 1$ (clockwise ring 212);

else update $t_i^- = t_{POTENTIALi}^-$; set $x_k = 0$ (counterclockwise ring 214);

where,

| Term | Definition |
| --- | --- |
| $T^+$ | $\max_i \{t_i^-, T_{POTENTIALi}^+\}$ |
| $T^-$ | $\max_i \{t_i^+, T_{POTENTIALi}^-\}$ |
| $t_i^+$ | existing traffic volume on each respective clockwise segment $i^+$ |
| $t_i^-$ | existing traffic volume on each respective counterclockwise segment $i^-$ |
| $t_{POTENTIALi}^+$ | $t_i^+ + D_k \cdot e_{ik}$, for all $i^+$ potential traffic volume on each respective clockwise segment if $D_k$ is routed in the clockwise direction |
| $t_{POTENTIALi}^-$ | $t_i^- + D_k \cdot b_{ik}$, for all $i^-$ potential traffic volume on each respective counterclockwise segment if $D_k$ is routed in the counterclockwise direction |
| $e_{ik}$ | 1, if $D_k$ routed in the clockwise direction uses segment $i^+$ 0, otherwise |
| $b_{ik}$ | $1 - e_{ik}$ |
| $x_k$ | 1, if demand $D_k$ will go in the clockwise direction 0, otherwise |
| $n^+_k$ | number of segments traversed to route $D_k$ in the clockwise direction |
| $n^-_k$ | number of segments traversed to route $D_k$ in the counterclockwise direction |
| $D_k$ | traffic demand, k = 1, ..., Q |
| i | segment, i = 1, ..., N, where N is the total number of segments |

As shown in FIG. 3, using the above-described algorithms, traffic demands are routed from the originating station to the destination station in either the clockwise or counterclockwise direction to provide global fairness across the entire network. For example, using the above-described algorithms, traffic demands may be routed so that the incremental increase in the network load is the smallest. While only six traffic demands are shown in FIG. 3, one skilled in the art should appreciate that additional traffic demands may be included in accordance with methods and systems consistent with the present invention.

Moreover, those skilled in the art should also appreciate that traffic demands may be routed based on additional and/or alternative parameters. For example, in addition to load considerations, additional consideration may be given to a traffic demand's sensitivity to interrupted transmission (e.g., traffic class), the reliability or restricted bandwidth of transmission equipment (e.g., a faulty segment), subscriber status (e.g., more valued customers may be provided preferential or more reliable bandwidth), and the like. Accordingly, the embodiments of the present invention do not necessarily require global fairness. In one embodiment of the present invention, such additional and/or alternative parameters may be modeled as weighted traffic demands during the sorting step. For example, a traffic demand from a preferred subscriber may be routed first, regardless of its actual size.

The above-described algorithms may be performed by a variety of hardware and software techniques known to those skilled in the art. For example, in one embodiment of the present invention, the algorithms may be performed by a traffic management system. The traffic management system is a logical entity that may, for example, comprise a software program operating on a computer system.

While the above-described algorithms illustrate a method of allocating traffic demands $D_k$ prior to their actual transmission, it should be appreciated that embodiments of the present invention may be implemented in real time. Specifically, because traffic demands are time dependent, a new demand may arise or an existing demand may be terminated. When this happens, the above-described algorithms may be repeated with the new set of demands, rerouting existing demands if necessary. Alternatively, in accordance with another embodiment of the present invention, each new traffic demand may be routed over the existing traffic, where the termination of a traffic demand is modeled as a new negative traffic demand that must be subtracted from the existing traffic volume of the relevant segments.

Figure 4:
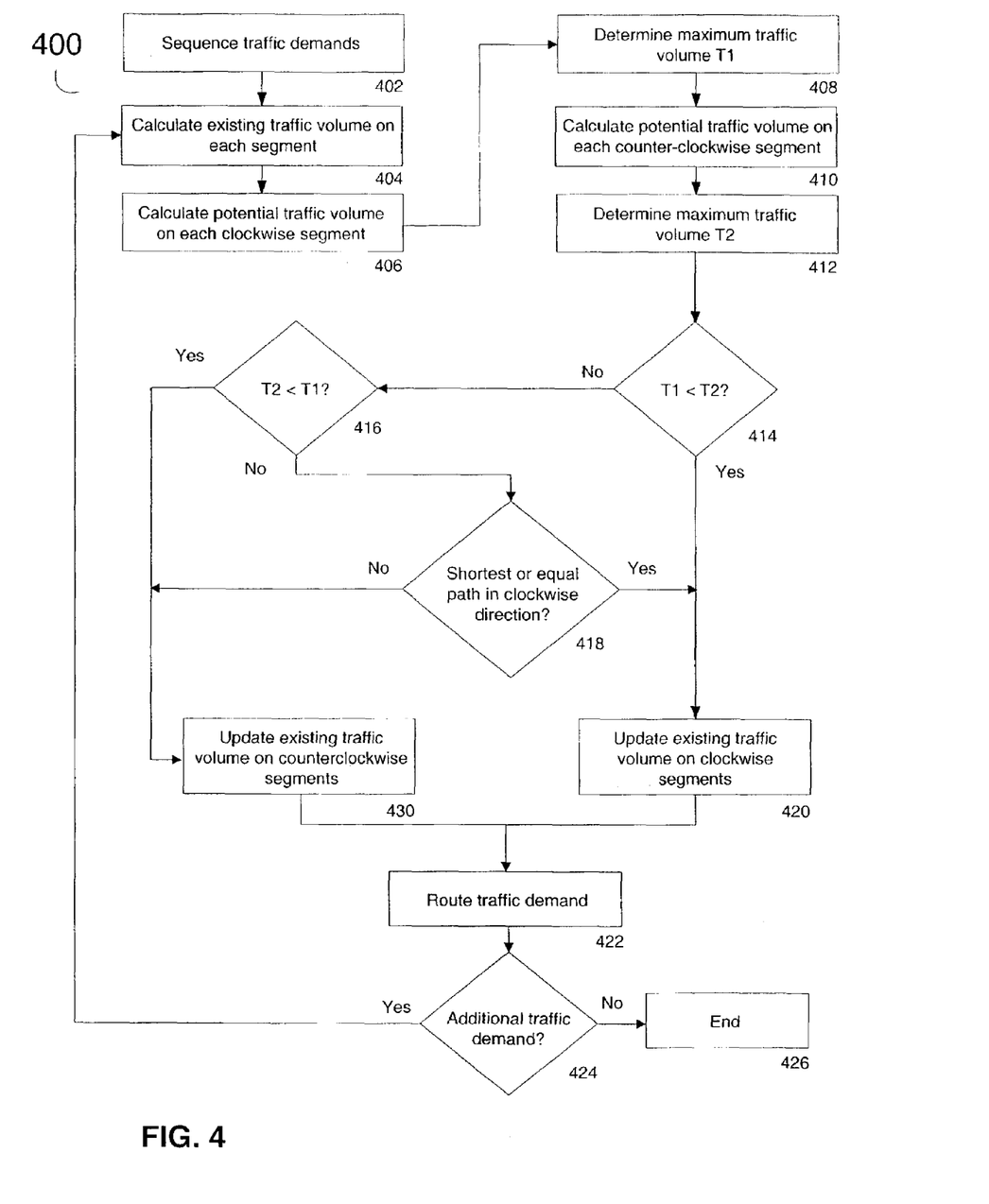
FIG. 4 illustrates a flow chart of a method for allocating traffic demands on a network in accordance with methods and systems consistent with the present invention.

Referring now to FIGS. 2 and 4, a method 400 for allocating traffic demands on a network will be described in accordance with methods and systems consistent with the present invention. Method 400 begins at step 402, where the traffic demands are sequenced in descending order. Because provisioned traffic demands are known quantities, the traffic demands may be prearranged in accordance with their requirements and/or importance. For example, traffic demands may be ordered by load, traffic class, and/or the like. Alternatively, traffic demands may be sequenced in random order or the order in which they were received.

From step 402, method 400 proceeds to step 404, where the existing traffic volume is determined for each segment of both rings 212 and 214. In accordance with one embodiment of the present invention, existing traffic volume on each segment is monitored by the respective stations and therefore are known quantities. For simplicity, however, method 400 will be described assuming that no traffic initially exists on ring 210 at step 404.

Method 400 then proceeds to step 406, where the potential traffic volume of each segment of ring 212 is calculated if the relevant traffic demand (e.g., traffic demand $D_x$) was to be routed on ring 212 (clockwise). For example, assuming the traffic demand $D_x$ is the initial traffic demand and comprises a 10 Mbps communication between station 250a to 250b, the potential traffic volume on ring 212 would be 10 Mbps on segments 212ab and 0 Mbps on segments 212bc, 212cd, and 212da. Method 400 then continues to step 408.

At step 408, a maximum traffic volume for ring 212 (T1) is determined from a set including the existing traffic volume for each segment of ring 214 as well as the potential traffic volume for each segment of ring 212. In the above described example, because the existing traffic volume is 0 Mbps for each segment, the maximum traffic volume T1 will be 10 Mbps from the potential traffic volume of segment 212ab.

From step 408, method 400 proceeds to step 410, where the potential traffic volume of each segment of ring 214 is calculated if the relevant traffic demand were to be routed on ring 214 (counterclockwise). For example, assuming the traffic demand $D_x$ is the initial traffic demand and comprises a 10 Mbps communication between station 250a to 250b, the potential traffic volume on ring 214 would be 10 Mbps on segments 214ad, 214dc, and 214cb and 0 Mbps on segment 214ba. Method 400 then continues to step 412.

At step 412, a maximum traffic volume for ring 214 (T2) is determined from a set including the existing volume for each segment of ring 212 as well as the potential traffic volume for each segment of ring 214. In the above described example, because the existing traffic volume is 0 Mbps for each segment, the maximum traffic volume T2 will be 10 Mbps from the potential traffic volume of segments 214ad, 214dc, and 214cb.

From step 412, method 400 proceeds to decision block 414, where it is determined whether the maximum traffic volume of ring 212 T1 is less than the maximum traffic volume of ring 214 T2. If so, then method 400 proceeds to step 420, where the existing traffic volume of each segment of ring 212 is replaced by its corresponding potential traffic volume calculated at step 406.

Method 400 then continues to step 422, where the relevant traffic demand is routed on ring 212. In an alternate embodiment of the present invention, method 400 may be practiced during a preliminary setup period before the relevant traffic demand is actually routed. In that case, each traffic demand may merely be marked to indicate which ring the demand will eventually be routed.

If, at decision block 414, the maximum traffic volume of ring 212 T1 is not less than the maximum traffic volume of ring 214 T2, then method 400 branches to decision block 416. At decision block 416, it is determined whether the maximum traffic volume of ring 214 T2 is less than the maximum traffic volume of ring 212 T1. If so, then method 400 proceeds to step 430, where the existing traffic volume of each segment of ring 214 is replaced by its corresponding potential traffic volume calculated at step 410.

Method 400 then continues to step 422, where the relevant traffic demand is routed on ring 214. In an alternate embodiment of the present invention, method 400 may be practiced during a preliminary setup period before the relevant traffic demand is actually routed. In that case, each traffic demand may merely be marked to indicate which ring the demand will eventually be routed.

If, at decision block 416, the maximum traffic volume of ring 214 T2 is not less than the maximum traffic volume of ring 212 T1, then method 400 branches to decision block 418. At decision block 416, it is determined whether the shortest distance between the origination and destination stations is on ring 212 (e.g., the shortest number of segments). If so, then method 400 proceeds to step 420, where the existing traffic volume of each segment of ring 212 is replaced by its corresponding potential traffic volume calculated at step 406. If not, then method 400 proceeds to step 430, where the existing traffic volume of each segment of ring 214 is replaced by its corresponding potential traffic volume calculated at step 410.

From step 422, method 400 then progresses to step decision block 424, where it is determined whether another traffic demand from the set of traffic demands sequenced at step 402 requires routing. If so, method 400 returns to step 404, where steps 404 through 424 are repeated for the next traffic demand. If, at decision block 408, no other traffic demands require routing, the method 400 ends at step 426.

While it has been illustrated and described what is at present considered to be the preferred embodiments and methods of the present invention, it will be understood by those skilled in the art that various changes and modifications may be made, and equivalents may be substituted for elements thereof without departing from the true scope of the invention. For example, while the embodiments described above have been described with reference to an RPR network, it should be appreciated that aspects of the present invention may be practiced other network protocols. Therefore it is intended that the invention not be limited to the particular embodiments and methods disclosed herein, but the invention includes all embodiments falling within the scope of the appended claims.

What is claimed is:

1. A method of allocating a plurality of traffic demands on a network having a plurality of stations connected by a bi-directional ring, comprising the steps of:
   sequencing the plurality of traffic demands in descending order;
   selecting a first traffic demand from the plurality of traffic demands;
   acquiring a first existing traffic volume for a first direction of the bi-directional ring;
   acquiring a second existing traffic volume for a second direction of the bi-directional ring; and
   selecting between the first and second directions for transmitting the first traffic demand based on a first parameter,
   wherein the step of selecting between the first and second directions comprises determining whether to route the first traffic demand instead of existing traffic,
   wherein the step of sequencing comprises ordering one or more of the plurality of traffic demands based on sensitivity to interrupted transmission of each one of the one or more traffic demands and subscriber status of a subscriber receiving or transmitting each one of the one or more traffic demands,
   wherein the bi-directional ring provides concurrent direct transmission of data in both directions between a first station and a second station adjacent to the first station, and
   wherein data transmitted from the first station to the second station is independent of data transmitted concurrently from the second station to the first station.

2. The method of claim 1, wherein the first parameter comprises a load on the bi-directional ring, wherein the selecting step is performed so as to select the smallest incremental increase in the load of the bi-directional ring.

3. The method of claim 1, wherein the bi-directional ring comprises a Resilient Packet Ring.

4. The method of claim 1, wherein the step of sequencing comprises ordering one or more of the plurality of traffic demands based on a criteria.

5. The method of claim 4, wherein the criteria comprises the size of each traffic demand, the sensitivity of each traffic demand, or the type of each traffic demand.

6. The method of claim 1, wherein the step of selecting between the first and second directions further comprises the steps of:

calculating a first potential traffic volume of the bi-directional ring if the first traffic demand was transmitted in the first direction;

calculating a second potential traffic volume of the bi-directional ring if the first traffic demand was transmitted in the second direction;

determining a first maximum load from the first potential traffic volume and the second existing traffic volume;

determining a second maximum load from the second potential traffic volume and the first existing traffic volume; and comparing the first and second maximum loads, wherein the first traffic demand is routed in the first direction if the first maximum load is less than the second maximum load and the first traffic demand is routed in the second direction if the second maximum load is less than the first maximum load.

7. The method of claim 5, wherein the first traffic demand is routed in the direction of the shortest transit path if the first maximum load is equal to the second maximum load.

8. The method of claim 5, including the steps of:

updating the first existing traffic volume to reflect the first potential traffic volume if the first maximum load is less than the second maximum load; and updating the second existing traffic volume to reflect the second potential traffic volume if the second maximum load is less than the first maximum load.

9. The method of claim 8, further comprising the steps of:

selecting a second traffic demand from the plurality of traffic demands;

acquiring a third existing traffic volume for the first direction of the bi-directional ring;

acquiring a fourth existing traffic volume for the second direction of the bi-directional ring;

selecting between the first and second directions for transmitting the second traffic demand based on the smallest incremental increase in a load of the bi-directional ring, wherein the steps for acquiring the third and fourth existing traffic volumes are based on the updating steps.

10. The method of claim 9, wherein the first traffic demand is not transmitted until after the step of selecting between the first and second directions for transmitting the second traffic demand is performed.

11. The method of claim 1, wherein the step of sequencing further comprises ordering the one or more traffic demands based on a criteria comprising a type of each traffic demand, the type is at least one of low-jitter traffic, bounded-jitter traffic, and unprovisioned traffic.

12. A method of allocating a plurality of traffic demands on a network having a plurality of stations, including a first station and a second station connected by a first ring for transmitting traffic in a first direction and a second ring for transmitting traffic in a second direction, comprising the steps of:

sequencing the plurality of traffic demands in descending order, wherein the step of sequencing comprises ordering one or more of the plurality of traffic demands based on sensitivity to interrupted transmission of each one of the one or more traffic demands and subscriber status of a subscriber receiving or transmitting each one of the one or more traffic demands;

receiving a first traffic demand at the first station destined for the second station, wherein the first traffic demand may be routed between the first and second stations on the first or second ring and the first and second stations are connected by a first and second segment to form the first ring and a third and fourth segment to form the second ring;

determining a first, a second, a third, and a fourth existing load on the first, second, third, and fourth segments, respectively;

selecting between the first and second rings to transmit the first traffic demand based on which ring will provide the smallest increase in the first, second, third, and fourth existing loads, wherein the step of selecting between the first and second rings comprises determining whether to route the first traffic demand instead of existing traffic; and routing the first traffic demand in accordance with the selecting step, wherein the first ring and the second ring provide concurrent direct transmission of data in both directions between the first station and one of the stations adjacent to the first station, and wherein data transmitted from the first station to the adjacent station is independent of data transmitted concurrently from the adjacent station to the first station.

13. The method of claim 12, wherein the step of selecting between the first and second rings further comprises the steps of:

calculating a first and a second potential traffic volume of the first and second segments if the first traffic demand was transmitted on the first ring;

calculating a third and a fourth potential traffic volume of the third and fourth segments if the first traffic demand was transmitted on the second ring;

determining a first maximum load from the first and second potential traffic volumes and the third and fourth existing traffic volumes;

determining a second maximum load from the third and fourth potential traffic volumes and the first and second existing traffic volumes; and comparing the first and second maximum loads, wherein the first traffic demand is routed on the first ring if the first maximum load is less than the second maximum load and the first traffic demand is routed on the second ring if the second maximum load is less than the first maximum load.

14. The method of claim 13, wherein the first and second rings form a Resilient Packet Ring.

15. The method of claim 13, wherein the first traffic demand is routed in the ring with the shortest transit path between the first and second stations if the first maximum load is equal to the second maximum load.

16. The method of claim 15, further comprising the steps of:

receiving a second traffic demand at the second station destined for the first station, determining a fifth, a sixth, a seventh, and a eighth existing load on the first, second, third, and fourth segments, respectively;

selecting between the first and second rings to transmit the second traffic demand based on which ring will provide the smallest increase in the fifth, sixth, seventh, and eighth existing loads; and routing the second traffic demand in accordance with the selecting step for the second traffic demand.

17. A Resilient Packet Ring system comprising:

a plurality of stations interconnected by segments in a ring topology, each of the stations capable of transmitting and receiving traffic demands in a first direction and a second direction, wherein a first station is capable of concurrently transmitting a first traffic demand of data directly to a second station adjacent to the first station and receiving a second traffic demand of data directly from the second station, wherein the first traffic demand is independent of the second traffic demand;

a first ring comprising a first set of segments for transmitting and receiving traffic demands in the first direction; and a second ring comprising a second set of segments for transmitting and receiving traffic demands in the second direction;

a traffic management system for sequentially routing a plurality of traffic demands on the first and second rings to provide the smallest incremental increase in the maximum load of the first and second sets of segments, wherein sequentially routing a plurality of traffic demands comprises the steps of:

sequencing the plurality of traffic demands in descending order, wherein the step of sequencing comprises ordering one or more of the plurality of traffic demands based on sensitivity to interrupted transmission of each one of the one or more traffic demands and subscriber status of a subscriber receiving or transmitting each one of the one or more traffic demands;

acquiring an existing traffic volume of each segment in the first and second sets of segments;

determining whether to route the first traffic demand instead of existing traffic;

calculating a potential traffic volume of each segment in the first set of segments if the first traffic demand was transmitted on the first ring;

calculating a potential traffic volume of each segment in the second set of segments if the first traffic demand was transmitted on the second ring;

determining a first maximum load from the potential traffic volumes of the second set of segments and the existing traffic volumes of the first set of segments;

determining a second maximum load from the potential traffic volumes of the first set of segments and the existing traffic volumes of the second set of segments; and comparing the first and second maximum loads, wherein the first traffic demand is routed on the first ring if the first maximum load is less than the second maximum load and the first traffic demand is routed on the second ring if the second maximum load is less than the first maximum load.

18. The system of claim 17, wherein the first traffic demand is routed in the ring with the shortest transit path if the first maximum load is equal to the second maximum load.

19. The system of claim 17, wherein the traffic management system repeats the steps with respect to a second traffic demand.

* * * * *